March 10, 1942. J. BIJUR 2,275,414
LUBRICATION
Filed June 1, 1936
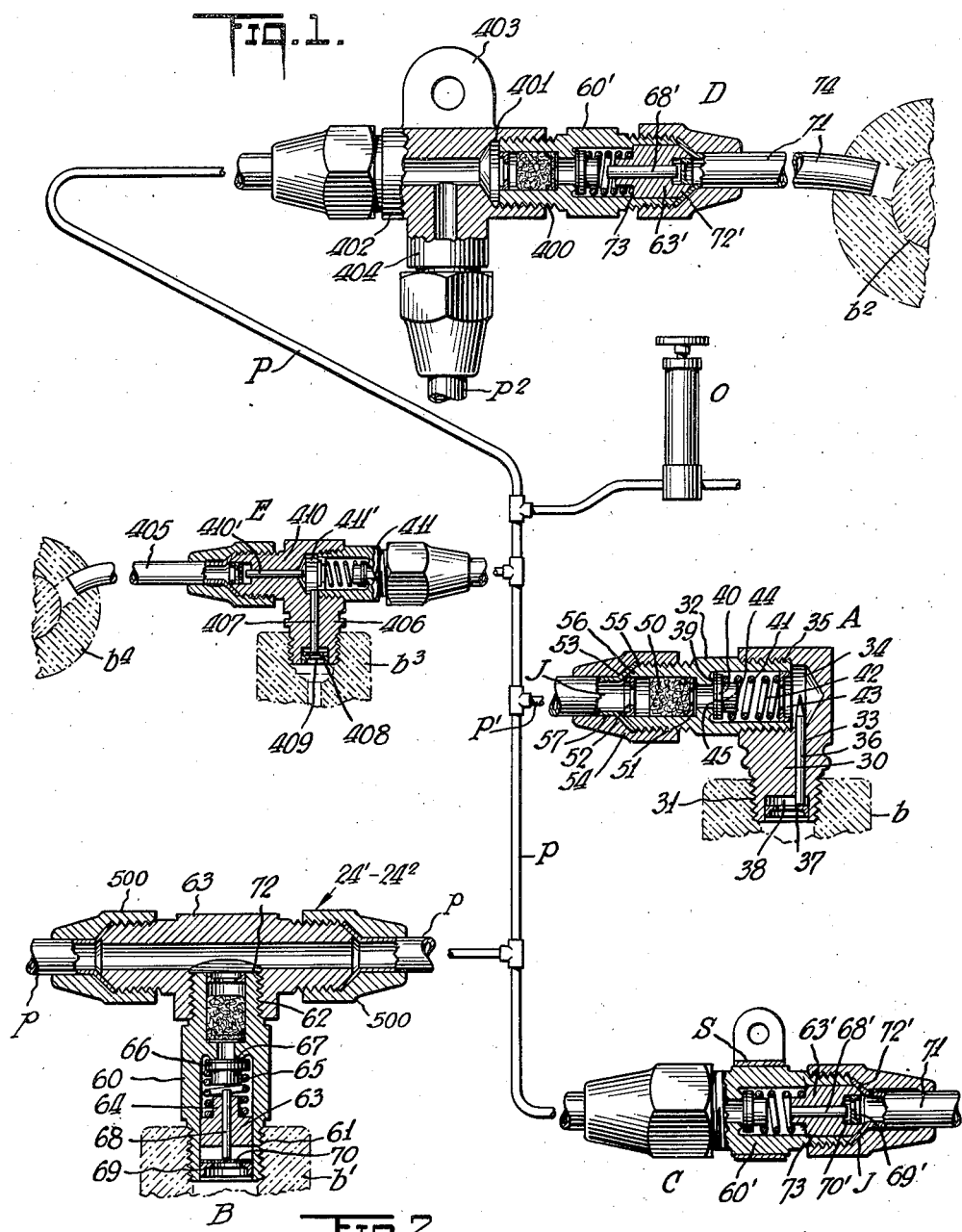
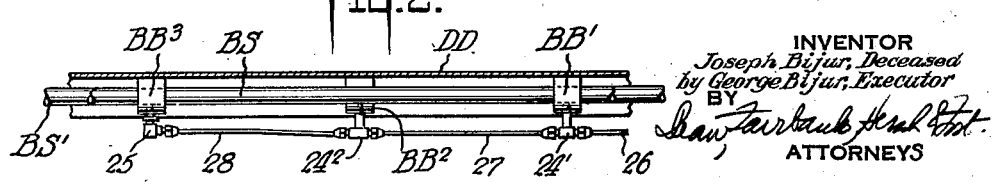

Patented Mar. 10, 1942

2,275,414

UNITED STATES PATENT OFFICE 2,275,414

LUBRICATION

Joseph Bijur, deceased, late of New York, N. Y., by George Bijur, executor, New York, N. Y., assignor to Auto Research Corporation, a corporation of Delaware Original applications February 28, 1924, Serial No. 695,740, and January 27, 1932, Serial No. 589,287. Divided and this application June 1, 1936, Serial No. 82,751

6 Claims. (Cl. 184—7)

The present invention is concerned especially with centralized lubrication.

It is an object of the invention to reduce to a minimum the number of fittings and the lengths of pipe or tubing required for the installation of a central lubrication system.

In its application to chassis and other machine lubrication and in analogous relations, it is a more specific object of the invention to mount securely a tubing installation for distributing lubricant to bearings of any number or arrangement and without the use of fittings or mounting holes other than the terminals through which lubricant is fed from the tubing directly into the respective bearings; and this without equipping the terminal fittings with more bulky or more specialized flow control parts than would otherwise suffice.

Another object is to provide a piping and terminal fitting struction of the type referred to, peculiarly applicable to pressure lubricating systems, which lends itself for embodiment with various types of pressure-operated systems.

A feature of the invention is the mounting of the flow control instrumentality or outlet proportioning element, whether of the drip plug, the measuring valve or other type, longitudinally within the supporting body, stem or shank of a fitting, the construction of which includes two or more arms for pipe coupling connections, which arms are preferably embodied in a unitary cross or junction head, integral with or separately mounted upon the stem and conformed for application thereto of the corresponding ends of various associated segments of the tubing system and serving also as the inlet to the flow control instrumentality in the fitting stem.

For economy and convenience, it may be preferred for many purposes to provide a stem fitting, that houses the flow control instrumentalities therein, and to which may be interchangeably affixed a T or angle head or a junction head with the requisite number of pipe terminal arms or sockets, directed in a common plane or in different planes according to the arrangement of the associated tubing segments.

The stem being a straight pipe element, may be substantially of the same construction and may have the identical flow control parts therein as would serve for controlling the flow of lubricant to the bearings at the various extremities of the mains and the branch tubes.

The junction constructions set forth lend themselves readily to the use of measuring valve control instrumentalities, which may include the strainer plug, the reciprocating piston and the check valve, the fitting stem being made of sufficient length to accommodate all said instrumentalities longitudinally thereof.

When such stem is applied to a bearing, the cross or junction head on the stem will be at such distance from the bearing, that the tightening of pipe couplings thereto by means of a wrench is not impeded by the proximity of the bearing or associated structure that mounts the fitting.

In the accompanying drawing, in which are shown one or more of various possible embodiments of the several features of the invention, Fig. 1 is a diagrammatic view showing the application and construction of various forms of drip plugs or metering units that may be mounted upon or adjacent to the bearings to supply said bearings with lubricant;

Fig. 2 is a side sectional view of a machine structure illustrating how the fittings of Fig. 1—B may be attached to a machine structure simultaneously to support a piping or tubing system and to meter the flow of lubricant to the bearings.

Referring now to Fig. 1, there is shown a centralized lubricating system P, P' and P², shown merely diagrammatically to suggest a conduit arrangement for supplying a multiplicity of distributed bearings of a mechanism or system of mechanisms.

A single suitable source of oil pressure is indicated diagrammatically at O and serves, when actuated or in operation, to place the entire piping under pressure. This pressure is sustained at or in advance of each bearing by a highly restricted pressure absorbing outlet in the pipe. The exit of the oil to the bearings will thus be at a slow predetermined rate which depends on the pressure at the source and is largely determined at each outlet by the resistance thereat.

The highly restricted outlets are embodied in pipe fittings, which may be called "meter unit fittings," types of which are shown in Fig. 1, and at A, B, C, D and E. The present invention is particularly directed to the device of Fig. 1—B.

To prevent slow draining of the pipe line while the pressure source is idle, which draining might occur by entry of air at a fitting at relatively high level, and escape of oil through one or more fittings at lower level, it is desirable to provide a check valve at or in association with each said fitting.

At A is shown a fitting of elbow form, having more or less general application, and shown supplied from the end of a branch pipe P'. The metering fitting has a stem illustratively shown threaded by pipe thread 31 into a bearing b in lieu of an oil or grease cup. A check valve cartridge 32 is threaded by pipe thread connection 35 into a corresponding transverse well 34 in the plug 30.

The plug-fitting 30 has a longitudinal circular bore 33 therein of approximately $\frac{1}{16}$ inch in diameter extending from near the base of well 34 and therefore eccentric of the fitting so as to afford a substantial length of thread 35 for secure hold of the valve fitting 32. Bore 33 is plugged with a length of metal wire or pin 36 of diameter only in the order of .002 inch smaller than the bore to leave but a minute annular crevice about ½ inch long for exit of the lubricant. The pin 36 is maintained in place by a metal cup 37, press-fitted into a socket 38 in the base of the plug 30, and the cup 37 is provided preferably with a central hole through which the lubricant passes.

The cross-sectional area of the annular crevice, though minute, can be made uniform within very fine limits, since it is the differential between the cross-section of a bore and a wire plug, both of appreciable dimensions and both of which can be easily formed accurately.

The check valve cartridge unit 32 is formed with an integral valve seat 39, against which the disk valve 40 is pressed by a coil spring 41, within the bore 42 of the fitting, said spring reacting against a perforated metal cup 43, press-fitted into the inner end of the cartridge 32.

In advance of the valve 32 is plugged a wad 50 of felt which serves as a strainer to intercept any chips that may be picked up by the oil. The wad is backed by a cup 51 of fine metal mesh, the latter to prevent any minute fibers from the felt passing to the valve seat 39. The felt is maintained in place against escape from the cartridge by a press-fitted perforated cap 52 at the inlet end thereof.

To assure effective seating of the check valve, the valve seat is preferably highly burnished and the seating surface of the valve is provided with a seating facing 44 of a material yielding to compensate for possible irregularities in the seat, smooth, to seat completely under light pressure, substantially impervious and chemically inert to oil and non-sticking. In one type of construction, the seating portion comprises an oil-proof yielding backing with a smooth oil-proof, pliable and non-sticking facing to engage the valve seat.

The backing may be smooth cork, or oil-proof rubber compound, one commercial form of which is known as "Hippohyde", varnished cambric, or any oil-proof gasket material. The facing may be metal foil, animal membrane, sheet Celluloid, non-porous leather or leather substitute, or oil paper, linen or silk.

The elbow fitting A described, serves more particularly as a terminal fitting, that is, a fitting connected to the extreme end of a pressure line, said fitting delivering through the restriction pin thereof, the entire discharge therethrough to the bearing at which the fitting is applied.

It may be accordingly designated the "terminal metering fitting".

The preferred coupling J between the lubricant delivery pipe and the metering fitting, is shown on an enlarged scale at C in Fig. 1.

At B is shown a fitting similar in general principle to that described, but formed in a straight line rather than of elbow formation, as fitting A.

This type of fitting has a particular field of application in association with a complementary pipe fitting, to feed lubricant to a bearing, substantially in the run of a line rather than at the terminal or end of the line, and it is accordingly designated a "line or run meter unit fitting".

In the application shown, the line fitting comprises the pipe fitting 60, which has a pipe thread 61 at its outlet, to be applied in the bearing b', and a similar pipe thread 62 at its inlet end, shown applied in a tubular pipe connecting fitting in the run of the line. The line fitting 60 in this embodiment has a plug 63 press-fitted thereinto, with a hub extension 64 encircled by spring 65 that urges valve 66 against its seat 67.

The restriction wire or pin 68 fits in an axial bore in the plug 63 and is retained against falling out of the fitting by a perforated press-fitted cap 69, backed by a sheet 70 of fine wire mesh.

It will be seen that when pressure is applied at the source, the line fitting will feed lubricant at the predetermined rate to the associated bearing, while the main charge is passed on through the length of the line which is tapped by said line drip plug. Other features of construction and of the operation of the line fitting B will be apparent from the description of the terminal unit A.

As indicated at 72 the unit when inserted into the head or cap will not block the bore therethrough.

In Fig. 1—C, the ring S may be utilized to hold the unit body 60', said ring S being provided with an ear by which the body 60' may be conveniently attached to a frame structure, as for example to the side view members of the chassis frame.

Where there is insufficient room to affix at the bearing the unit to supply the same, it may be preferred to employ the arrangement of fitting shown at C in Fig. 1, connecting such fitting to the bearing (not shown) through an intervening length of pipe 71. For this purpose, there is provided a fitting of the straight formation shown at B rather than of the elbow formation shown at A, said C being positioned in the length of the line.

As the outlet end of the small diameter fitting B has a pipe thread and an insufficient thickness of wall for the bevel to effect a coupling connection of the type shown at J in Fig. 1—A with the flared pipe end, the construction shown at C is modified somewhat, as shown, with respect to that at B.

In the fitting C, the plug 63' is seated against a shoulder 73 in the bore of pipe fitting 60', and protrudes from said fitting, the desired bevel 72' for the pipe being formed in part on the thin fitting wall, and in part on plug 63'. The restriction wire or pin 68' is kept from falling out of its bore by a cap 69' press-fitted into a corresponding socket 70' in plug 63' and having an eccentric outlet aperture.

As indicated at J in fitting C of Fig. 1, the end of the pipe 71 is flared so as to contact closely with the bevel at the outlet end of the drip plug C, and the nut, as shown, is slipped onto the pipe either before flaring or from the other end thereof and when it is tightened upon the threaded end of the fitting, it will clamp the flared end of the pipe in lubricant-tight relation with respect to the body.

Another type of fitting is shown at D, and this is particularly useful for delivering lubricant in parallel to two bearings, at one of which, for instance, because of lack of room, it is not desired to directly apply a drip plug.

In this relation, it will be seen that a structure 60' and that at C has a pipe thread 400 at the inlet end thereof, rather than the cylindrical screw thread in the fitting at C, said pipe thread fitting into a corresponding socket 401 in a T fitting 402 by which it is carried.

The T fitting may be a casting provided with an integral mounting lug 403 by which it is secured to the supporting structure and as shown, has a direct passage therethrough supplied from the pipe P and delivering to the drip plug structure. The integral stem 404 of the T fitting feeds through a pipe P² to some other bearing, the flow through said pipe controlled by an appropriate fitting (not shown) in advance of or at a bearing (not shown) supplied therefrom.

The outlet end of the body 60', as shown at D of Fig. 1 may be connected to the conduit 71 leading to a bearing $b^2$, the connection shown in Fig. 1 at D being identical with that shown in Fig. 1 at C.

At E, is illustratively shown a fifth type of fitting, controlling the flow not only to the bearing $b^3$, at which it is mounted, but also that to a line 405 which may lead to some other bearing $b^4$.

The construction shown comprises an elbow casting having a supporting stem 406 threaded into the bearing and provided preferably with an axial restriction pin 407 supported by a friction-fitted perforated cap 408 backed by a sheet 409 of metal mesh.

The arm 410 of the elbow fitting has a restriction pin 410' held in place by means similar to that for retaining pin 407 in place. Into a well 411' at the back of arm 410 and coaxial therewith is threaded a valve cartridge 411 preferably identical with the cartridge 32 of fitting A.

Pipe P is connected by a coupling of the type shown at J at A to the inlet of cartridge 411 and a pipe 405 leading to another bearing is connected by a similar coupling to the end of restriction arm 410. In the compound drip plug fitting just described, it will thus be seen that when pressure is applied to the line, the valve in cartridge 411 will be forced open and lubricant will drip past the restriction determined by pin 407 to the bearing $b^3$ and in parallel and simultaneously therewith, past restriction 410' to and through pipe 405 to the bearing $b^4$ at the end of the latter.

As shown in the drawing, the restriction pins in all of the fittings described, preferably protrude beyond the ends of the bores into which they fit, so that the restriction crevice is of substantially uniform effectiveness from end to end of the restriction bore, where local variations in resistance might be incurred if the restriction pin were shorter than the bore therefor.

In Fig. 2, the bearings $BB^1$, $BB^2$ and $BB^3$ are lubricated from the tubing system 26, 27 and 28 which tubing system is supported from said bearings by the junction fittings $24^1$, $24^2$ and 25, the junction fittings $24^1$ and $24^2$ being as indicated at Fig. 1B and the junction fitting 25 being of the type shown at Fig. 1A.

The fitting $24^2$ of Fig. 2 may also take the form as shown in Fig. 1E in which case both restrictions at $24^2$ feed the bearings $BB^2$ and $BB^3$.

As indicated in Fig. 2, the bearings $BB^1$, $BB^2$ and $BB^3$ carry the shafts BS and $BS^1$ and the bearing structures are supported on the machine frame DD.

It is to be understood that instead of the pin restrictions shown in Fig. 1, screw restrictions, compressed felts or even measuring valves may be utilized as shown in Patents, No. 1,734,026 and No. 1,734,027, and Patents No. 1,975,920, No. 2,009,428, and No. 2,003,281, and in copending applications, Serial No. 24,651, now Patent No. 2,197,247, and Serial No. 24,652.

Referring to Fig. 1B it will be noted that the flow controlling parts are all lodged in the shank or stem 60, thus, not interfering with, or impeding, the flow of lubricant lengthwise through the cross head 63 which may have a large number of outlet arms instead of the one outlet arm shown. The stem 60 should be of such length that the cross head 63 is not so near the bearing as to interfere with the application of a wrench for tightening up the coupling units 500 which form a liquid-tight connection in respect to the tubing p.

There is thus provided a T fitting, which embodies not only a controlling pipe terminal or outlet, but which carries at the cross head thereof, the associated terminals for various segments of distributing tubing, for leading lubricant toward and away from the fitting.

All of the control parts are mounted in the stem, which is a self-contained assembly, into which the cross head delivers lubricant.

While a wrench may be applied to the hexagon stem for installing the fitting, or for removing it from the bearing, separation of the fitting parts is guarded against should torque be applied to the cross head rather than to the stem. The joint between the stem and the cross head is rendered secure, preferably by shellac.

The various fittings shown in Figs. 1 and 2 may be made of castings or forging and of copper, brass, bronze or iron.

Many of the parts indicated may be formed from bar stock.

The present application is a division of application Serial Number 695,740, filed February 28, 1924, through application Serial No. 589,287, filed January 27, 1932, and Figs. 1 and 2 of this application are identical with Figs. 1 and 6 respectively of said early application. Application Serial No. 589,287 has now matured into Patent No. 2,064,877.

It will thus be seen that there is herein described a device in which the several features of this invention are embodied, and which device in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

What is claimed:

1. For use in a centralized lubricating installation to supply proportioned quantities of lubricant to a plurality of spaced bearings in and about a mechanism, said lubricating installation being of the type having a branched distributing tubing system having a plurality of separate conduits or tubing sections; means to connect together said conduits or tubing sections in the run of the system and support said system in part from said bearings, said means including a lubricant flow metering fitting combination connecting together and establishing communication between a plurality of conduits and supplying a metered portion of the lubricant passing through the conduits to a bearing structure to which it is attached and upon which it supports said conduits, said fitting comprising a metal stem, the end portions of which are formed into nipples and which is interiorly provided with a longitudinal passageway from end to end thereof substantially plugged by a flow metering instrumentality and a metal cap for said stem provided with a socket rigidly embracing and enclosing one of said nipples, with a plurality of passageways therethrough with centrally aligned axes at substantial angles to said longitudinal passageway and in communication with said longitudinal passageway through said socket from the place of juncture of said conduits and with coupling connections at the outer ends of said passageways enabling the rigid, liquid-tight attachment of said conduits, the other nipple being rigidly inserted into a socket in the bearing structure.

2. For use in a centralized lubricating installation to supply proportioned quantities of lubricant to a plurality of spaced bearings in and about a mechanism, said lubricating installation being of the type having a branched distributing tubing system having a plurality of separate conduits or tubing sections; means to connect together said conduits or tubing sections in the run of the system and support said system in part from said bearings, said means including a lubricant flow metering T fitting combination connecting together and establishing communication between a pair of conduits and supplying a metered portion of the lubricant passing through the conduits to a bearing structure to which it is attached and upon which it supports said conduits, said fitting comprising a stem, the end portions of which are threaded and which is interiorly provided with a longitudinal passageway from end to end thereof substantially restricted by a metallic plug held in position therewithin, and an elongated cap for said stem provided with a central tapped socket embracing and rigidly screw upon one of said threaded end portions, with a longitudinal passage centrally therethrough at right angles to said first mentioned longitudinal passage and in continuous open communication with said socket and with means at the outer ends of said passageways enabling rigid, liquid-tight attachment of said conduits, the other nipple being adapted to be rigidly inserted into a tapped socket in the bearing structure.

3. For use in a centralized lubricating installation to supply proportioned quantities of lubricant to a plurality of spaced bearings in and about a mechanism, said lubricating installation being of the type having a branched distributing tubing system having a plurality of separate conduits or tubing sections; means to connect together said conduits or tubing sections in the run of the system and support said system in part from said bearings, said means including a lubricant flow metering T drip plug combination, connecting together and establishing communication between a pair of conduits and supplying a metered portion of the lubricant passing through the conduits to a bearing structure to which it is attached and upon which it supports said conduits, said fitting comprising a stem, the end portions of which are threaded and which is interiorly provided with a longitudinal passageway from end to end thereof substantially restricted by a metallic plug and a valve and a strainer extending thereacross and a cap for said stem provided with a tapped socket screwed rigidly upon one of said threaded end portions, with a passageway passing through, and at right angles to, said socket and in communication with passageway in said stem and with means at the outer end of said passageway enabling the rigid, liquid-tight attachment of said conduits, said embraced threaded end portion affording substantial clearance with respect to said socket so as to permit free passage therethrough between the separated portions of the passageway in said cap and the other threaded end portion being adapted to be rigidly screwed into a socket in the bearing structure.

4. For use in a centralized lubricating installation to supply proportioned quantities of lubricant to a plurality of spaced bearings in and about a mechanism, said lubricating installation being of the type having a branched distributing tubing system having a plurality of separate conduits or tubing sections; means to connect together said conduits or tubing sections in the run of the system and support said system in part from said bearings, said means including a lubricant drip plug combination, connecting together and establishing communication between a plurality of conduits and supplying a metered portion of the lubricant passing through the conduits to a bearing structure to which it is attached and upon which it supports said conduits, said fitting comprising a stem, the end portions of which are threaded and which is interiorly provided with a central longitudinal passageway from end to end thereof substantially restricted by a metallic plug and having a strainer positioned before said plug and a valve, and a cap for said stem provided with a plurality of small bores with intersecting axes, the ends of which are enlarged to form tapped sockets, one of which embraces and is threaded rigidly upon one of said threaded end portions, enables communication between said bores and said longitudinal passageway and the other of which tapped sockets enable the rigid, liquid-tight attachment of said conduits, the other threaded end portion of said stem being adapted to be rigidly inserted into a socket in the bearing structure.

5. For use in a centralized lubricating installation to supply proportioned quantities of lubricant to a plurality of spaced bearings in and about a mechanism, said lubricating installation being of the type having a branched distributing tubing system having a plurality of separate conduits or tubing sections; means to connect together said conduits or tubing sections in the run of the system and support said system in part from said bearings, said means including a unitary fitting for a central lubricating system including a support stem of substantial length adapted to be applied to a bearing, a head having radiating arms and carried by the outer end of said stem, pre-rated flow control means including a plurality of elements, all of diameter smaller than said stem extending longitudinally thereof and substantially occupying the entire length of said stem, said instrumentalities being all toward one side of the passage through the head that connects the various outlets thereof.

6. For use in a centralized lubricating installation to supply proportioned quantities of lubricant to a plurality of spaced bearings in and about a mechanism, said lubricating installation being of the type having a branched distributing tubing system having a plurality of separate conduits or tubing sections; means to connect together said conduits or tubing sections, means to connect together said conduits or tubing sections in the run of the system and support said system in part from said bearings, said means including a unitary distributing fitting for a central chassis lubricating system including a support stem having one end to be affixed to a bearing to be lubricated, flow controlling instrumentalities of fixed flow discharge, lodged within and substantially filling a corresponding bore in said stem and a distributing head having a plurality of radiating arms and having a socket extending substantially midway between said arms, said socket threaded upon the other extremity of the stem, said head affording a substantially free passage about the extremity of the stem for communication between said arms.

GEORGE BIJUR,
*George Bijur, Executor of the Estate of Joseph Bijur, Deceased.*